United States Patent
Bale et al.

(10) Patent No.: US 9,699,022 B2
(45) Date of Patent: Jul. 4, 2017

(54) SYSTEM AND METHOD FOR CONTROLLER REDUNDANCY AND CONTROLLER NETWORK REDUNDANCY WITH ETHERNET/IP I/O

(71) Applicant: Honeywell International Inc., Morristown, NJ (US)

(72) Inventors: Sunil Bale, Karnataka (IN); Srinivas Atukuri, West Chester, PA (US); Joseph Felix, Jenkintown, PA (US)

(73) Assignee: Honeywell International Inc., Morris Plains, NJ (US)

( * ) Notice: Subject to any disclaimer, the term of this patent is extended or adjusted under 35 U.S.C. 154(b) by 153 days.

(21) Appl. No.: 14/449,968

(22) Filed: Aug. 1, 2014

(65) Prior Publication Data

US 2016/0036626 A1 Feb. 4, 2016

(51) Int. Cl.
*H04L 12/24* (2006.01)
*H04L 12/935* (2013.01)
*H04L 12/939* (2013.01)

(52) U.S. Cl.
CPC .......... *H04L 41/0677* (2013.01); *H04L 49/30* (2013.01); *H04L 49/555* (2013.01)

(58) Field of Classification Search
CPC .... H04L 41/0677; H04L 49/555; H04L 49/30
See application file for complete search history.

(56) References Cited

U.S. PATENT DOCUMENTS

| | | |
|---|---|---|
| 4,679,189 A | 7/1987 | Olson et al. |
| 5,537,414 A | 7/1996 | Takiyasu et al. |
| 5,566,356 A | 10/1996 | Taketsugu |
| 5,664,195 A | 9/1997 | Chatterji |
| 5,749,053 A | 5/1998 | Kusaki et al. |

(Continued)

FOREIGN PATENT DOCUMENTS

| | | |
|---|---|---|
| DE | 4134207 C1 | 4/1993 |
| DE | 103 14 721 A1 | 11/2004 |

(Continued)

OTHER PUBLICATIONS

"Series 8, C300 Controller, User's Guide", Honeywell, Feb. 2014, see pp. 207-223, 271 pages.

(Continued)

*Primary Examiner* — Mohammad Anwar

(57) ABSTRACT

An apparatus includes a first controller having at least one interface and at least one processing device. The at least one interface is configured to communicate with a second controller and with a controlled network having multiple EtherNet/IP-compatible input/output (I/O) modules and multiple EtherNet/IP-compatible controlled devices. The at least one processing device is configured to detect a fault associated with the second controller while the second controller is in communication with at least one of the I/O modules and at least one of the controlled devices. The at least one processing device is also configured, upon detection of the fault associated with the second controller, to resume the communication with the at least one I/O module and the at least one controlled device without the at least one I/O module updating the at least one controlled device to a failsafe condition.

20 Claims, 3 Drawing Sheets

(56) References Cited

U.S. PATENT DOCUMENTS

| | | | |
|---|---|---|---|
| 5,790,419 A * | 8/1998 | Matsuda | B62D 5/0493 700/79 |
| 5,898,826 A | 4/1999 | Pierce et al. | |
| 6,170,044 B1 | 1/2001 | McLaughlin et al. | |
| 6,192,232 B1 | 2/2001 | Iseyama | |
| 6,256,297 B1 | 7/2001 | Haferbeck et al. | |
| 6,272,386 B1 | 8/2001 | McLaughlin et al. | |
| 6,292,905 B1 | 9/2001 | Wallach et al. | |
| 6,374,352 B1 | 4/2002 | Goldman et al. | |
| 6,427,071 B1 | 7/2002 | Adams et al. | |
| 6,437,692 B1 | 8/2002 | Petite et al. | |
| 6,631,416 B2 | 10/2003 | Bendinelli et al. | |
| 6,694,447 B1 | 2/2004 | Leach et al. | |
| 6,701,453 B2 | 3/2004 | Chrabaszcz | |
| 6,751,219 B1 | 6/2004 | Lipp et al. | |
| 6,847,316 B1 | 1/2005 | Keller | |
| 6,850,486 B2 | 2/2005 | Saleh et al. | |
| 6,917,584 B2 | 7/2005 | Kuwabara | |
| 6,963,781 B2 | 11/2005 | Fehrer et al. | |
| 7,031,308 B2 | 4/2006 | Garcia-Luna-Aceves et al. | |
| 7,035,937 B2 | 4/2006 | Haas et al. | |
| 7,058,848 B2 | 6/2006 | Sicola et al. | |
| 7,190,961 B2 | 3/2007 | Burr | |
| 7,203,743 B2 | 4/2007 | Shah-Heydari | |
| 7,236,987 B1 | 6/2007 | Faulkner et al. | |
| 7,240,188 B2 | 7/2007 | Takata et al. | |
| 7,275,157 B2 | 9/2007 | Cam Winget | |
| 7,366,114 B2 | 4/2008 | Park et al. | |
| 7,440,735 B2 | 10/2008 | Karschnia et al. | |
| 7,460,865 B2 | 12/2008 | Nixon et al. | |
| 7,620,409 B2 | 11/2009 | Budampati et al. | |
| 7,688,802 B2 | 3/2010 | Gonia et al. | |
| 7,792,126 B1 | 9/2010 | Montestruque et al. | |
| 7,802,016 B2 | 9/2010 | Eimers-Klose et al. | |
| 7,860,495 B2 | 12/2010 | McFarland | |
| 8,350,691 B2 | 1/2013 | Mcfarland | |
| 8,498,201 B2 | 7/2013 | Budampati et al. | |
| 8,503,288 B1 | 8/2013 | Howard | |
| 8,582,470 B2 | 11/2013 | Collins et al. | |
| 8,756,412 B2 | 6/2014 | Pulini et al. | |
| 2002/0045969 A1 | 4/2002 | Dierauer | |
| 2002/0072329 A1 | 6/2002 | Bandeira et al. | |
| 2002/0120671 A1 | 8/2002 | Daffner et al. | |
| 2002/0122230 A1 | 9/2002 | Izadpanah et al. | |
| 2002/0176396 A1 | 11/2002 | Hammel et al. | |
| 2003/0003912 A1 | 1/2003 | Melpignano et al. | |
| 2003/0005149 A1 | 1/2003 | Haas et al. | |
| 2003/0177150 A1 | 9/2003 | Fung et al. | |
| 2004/0010694 A1 | 1/2004 | Collens et al. | |
| 2004/0028023 A1 | 2/2004 | Mandhyan et al. | |
| 2004/0029553 A1 | 2/2004 | Cain | |
| 2004/0083833 A1 | 5/2004 | Hitt et al. | |
| 2004/0174829 A1 | 9/2004 | Ayyagari | |
| 2004/0230899 A1 | 11/2004 | Pagnano et al. | |
| 2004/0259533 A1 | 12/2004 | Nixon et al. | |
| 2005/0005200 A1 | 1/2005 | Matena et al. | |
| 2005/0059379 A1 | 3/2005 | Sovio et al. | |
| 2005/0071708 A1 | 3/2005 | Bartfai et al. | |
| 2005/0102562 A1 | 5/2005 | Shinohara et al. | |
| 2005/0141553 A1 | 6/2005 | Kim et al. | |
| 2005/0164684 A1 | 7/2005 | Chen et al. | |
| 2005/0201349 A1 | 9/2005 | Budampati | |
| 2005/0228509 A1 | 10/2005 | James | |
| 2005/0254653 A1 | 11/2005 | Potashnik et al. | |
| 2005/0281215 A1 | 12/2005 | Budampati et al. | |
| 2005/0289553 A1 | 12/2005 | Miki | |
| 2006/0002368 A1 | 1/2006 | Budampati et al. | |
| 2006/0015641 A1 | 1/2006 | Ocko et al. | |
| 2006/0039347 A1 | 2/2006 | Nakamura et al. | |
| 2006/0083200 A1 | 4/2006 | Emeott et al. | |
| 2006/0104301 A1 | 5/2006 | Beyer et al. | |
| 2006/0128349 A1 | 6/2006 | Yoon | |
| 2006/0171344 A1 | 8/2006 | Subramanian et al. | |
| 2006/0171346 A1 | 8/2006 | Kolavennu et al. | |
| 2006/0227729 A1 | 10/2006 | Budampati et al. | |
| 2006/0256740 A1 | 11/2006 | Koski | |
| 2006/0271814 A1 | 11/2006 | Fung et al. | |
| 2006/0274644 A1 | 12/2006 | Budampati et al. | |
| 2006/0274671 A1 | 12/2006 | Budampati et al. | |
| 2006/0282498 A1 | 12/2006 | Muro | |
| 2006/0287001 A1 | 12/2006 | Budampati et al. | |
| 2007/0021140 A1 * | 1/2007 | Keyes, IV | H02J 17/00 455/522 |
| 2007/0022317 A1 | 1/2007 | Chen et al. | |
| 2007/0030816 A1 | 2/2007 | Kolavennu | |
| 2007/0030832 A1 | 2/2007 | Gonia et al. | |
| 2007/0067458 A1 | 3/2007 | Chand | |
| 2007/0073861 A1 | 3/2007 | Amanuddin et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0103303 A1 | 5/2007 | Shoarinejad | |
| 2007/0147294 A1 | 6/2007 | Bose et al. | |
| 2007/0153677 A1 | 7/2007 | McLaughlin et al. | |
| 2007/0153789 A1 | 7/2007 | Barker, Jr. et al. | |
| 2007/0155423 A1 | 7/2007 | Carmody et al. | |
| 2007/0237137 A1 | 10/2007 | McLaughlin | |
| 2007/0261052 A1 | 11/2007 | Bale et al. | |
| 2007/0280178 A1 | 12/2007 | Hodson et al. | |
| 2008/0043637 A1 | 2/2008 | Rahman | |
| 2008/0140844 A1 | 6/2008 | Halpern | |
| 2008/0225737 A1 | 9/2008 | Gong et al. | |
| 2008/0267259 A1 | 10/2008 | Budampati et al. | |
| 2008/0273547 A1 | 11/2008 | Phinney | |
| 2009/0022121 A1 | 1/2009 | Budampati et al. | |
| 2009/0034441 A1 | 2/2009 | Budampati et al. | |
| 2009/0060192 A1 | 3/2009 | Budampati et al. | |
| 2009/0086692 A1 | 4/2009 | Chen | |
| 2009/0109889 A1 | 4/2009 | Budampati et al. | |
| 2011/0161538 A1 * | 6/2011 | Decker | G06F 11/2005 710/110 |
| 2012/0260127 A1 | 10/2012 | Jibbe et al. | |
| 2013/0274900 A1 | 10/2013 | Uhde et al. | |
| 2013/0277506 A1 | 10/2013 | Baldwin et al. | |
| 2014/0211661 A1 | 7/2014 | Gorkemli et al. | |

FOREIGN PATENT DOCUMENTS

| | | |
|---|---|---|
| DE | 10314721 A1 | 11/2004 |
| EP | 1 081 895 A1 | 3/2001 |
| EP | 1 401 171 A2 | 3/2004 |
| EP | 1 401 171 A3 | 3/2004 |
| EP | 1 439 667 A2 | 7/2004 |
| GB | 2 427 329 A | 12/2006 |
| WO | WO 01/35190 A2 | 5/2001 |
| WO | WO 01/35190 A3 | 5/2001 |
| WO | WO 03/079616 A1 | 9/2003 |
| WO | WO 2004/047385 A2 | 6/2004 |
| WO | WO 2004/047385 A3 | 6/2004 |
| WO | WO 2004/114621 A1 | 12/2004 |
| WO | WO 2006/017994 A1 | 2/2006 |
| WO | WO 2006/053041 A1 | 5/2006 |

OTHER PUBLICATIONS

Salman Taherian, et al., "Event Dissemination in Mobile Wireless Sensor Networks", 2004 IEEE International Conference on Mobile Ad-Hoc and Sensor Systems, p. 573-575.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

Ying Zhang, et al., "A Learning-based Adaptive Routing Tree for Wireless Sensor Networks", Journal of Communications, vol. 1, No. 2, May 2006, p. 12-21.

Yau-Ming Sun, et al., "An Efficient Deadlock-Free Tree-Based Routing Algorithm for Irregular Wormhole-Routed Networks Based

(56) References Cited

OTHER PUBLICATIONS on the Turn Model", Proceedings of the 2004 International Conference on Parallel Processing (ICPP'04), 10 pages.
Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.
"XYR 5000 Wireless Transmitters, Honeywell Solutions for Wireless Data Acquisiton and Monitoring," www.acs.honeywell.com, Feb. 2006, 6 pages.
Rahul Mangharam, et al., "Voice over Sensor Networks", RTSS, 2006, 10 pages.
A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.
International Search Report and Written Opinion of the International Searching Authority in PCT Application No. PCT/US2007/069717 dated Dec. 10, 2007.
International Search Report and Written Opinion of the International Searching Authority in PCT Application No. PCT/US2007/069614 dated Nov. 22, 2007.
International Search Report and Written Opinion of the International Searching Authority in PCT Application No. PCT/US2007/069710 dated Nov. 27, 2007.
International Search Report and Written Opinion of the International Searching Authority in PCT Application No. PCT/US2007/069705 dated Apr. 15, 2008.
Pereira, J.M. Dias, "A Fieldbus Prototype for Educational Purposes", IEEE Instrumentation & Measurement Magazine, New York, NY vol. 7, No. 1, Mar. 2004, p. 1-2.
International Search Report and Written Opinion of the International Searching Authority in PCT Application No. PCT/US2006/048334 dated Jul. 5, 2007.
Joseph Polastre, et al., "Versatile Low Power Media Access for Wireless Sensor Networks", SenSys '04, Nov. 3-5, 2004, Baltimore, Maryland, 13 pages.
U.S. Office Action dated Aug. 6, 2014 in connection with U.S. Appl. No. 12/628,918; 19 pages.

"Nano-RK: A Wireless Sensor Networking Real-Time Operating System", http://nanork.org/wiki, 3 pages.
"FireFly 2.2 Datasheet", Wireless Sensor Networks, Aug. 20, 2007, 24 pages.
Wei Ye, et al., "An Energy-Efficient MAC protocol for Wireless Sensor Networks", USC/ISI Technical Report ISI-TR-543, Infocom, Jun. 2002, p. 1-10.
Rahul Mangharam, et al., "Embedded Virtual Machines for Robust Wireless Control Systems", 29th IEEE Int'l. Conf. on Distributed Computing Systems, Jun. 2009, 6 pages.
Jason Hill, et al., "System Architecture Directions for Networked Sensors", ASPLOS-IX, Nov. 2000, Cambridge, MA, 12 pages.
Philip Levis, et al., "Mate: A Tiny Virtual Machine for Sensor Networks", ACM ASPLOS-X, 2002, 11 pages.
Phillip Stanley-Marbell, et al., "Scylla: A Smart Virtual Machine for Mobile Embedded Systems", In WMCSA, 2000, 10 pages.
Rene Muller, et al., "A Virtual Machine for Sensor Networks", ACM EuroSys, 2007, 14 pages.
Chih-Chieh Han, et al., "A Dynamic Operating System for Sensor Nodes", MobiSys, 2005: The Third International Conference on Mobile Systems, Applications, and Services, p. 163-176.
Adam Dunkels, et al., "Run-Time Dynamic Linking for Reprogramming Wireless Sensor Networks", SenSys '06, Nov. 1-3, 2006, Boulder, Colorado, 14 pages.
Rahul Mangharam, et al., "FireFly: A Cross-Layer Platform for Real-Time Sensor Networks", Real Time Systems Journal, 2007, 40 pages.
Jason Hill, et al., "The Platforms Enabling Wireless Sensor Networks", Communications of the ACM, Jun. 2004, vol. 47, No. 6, p. 41-46.
Anthony Rowe, et al., "RT-Link: A Time-Synchronized Link Protocol for Energy-Constrained Multi-hop Wireless Networks", IEEE SECON, 2006, 10 pages.
Paul F. McLaughlin, et al., "Redundant Process Controllers for Segregated Supervisory and Industrial Control Networks", U.S. Appl. No. 14/272,058, filed May 7, 2014.
International Search Report and Written Opinion issued for PCT/US2015/041512 dated Apr. 15, 2016, 11 pgs.

* cited by examiner

SYSTEM AND METHOD FOR CONTROLLER REDUNDANCY AND CONTROLLER NETWORK REDUNDANCY WITH ETHERNET/IP I/O

TECHNICAL FIELD

This disclosure relates generally to automation and control systems. More specifically, this disclosure relates to a system and method for controller redundancy and controller network redundancy with EtherNet/IP I/O.

BACKGROUND

Ethernet Industrial Protocol (EtherNet/IP) is a communication protocol used in industrial automation for process control. EtherNet/IP is an application layer protocol used for communication between industrial control systems and their components, such as programmable automation controllers, programmable logic controllers, and input/output (I/O) systems. In some respects, EtherNet/IP is similar to the Simple Network Management Protocol (SNMP). Various vendors manufacture EtherNet/IP I/O devices or provide control systems with controllers that can work with EtherNet/IP. The Open DeviceNet Vendors Association (ODVA) provides management of the EtherNet/IP protocol and assures multi-vendor system interoperability by requiring adherence to established standards.

SUMMARY

This disclosure provides a system and method for controller redundancy and controller network redundancy with EtherNet/IP I/O.

In a first embodiment, an apparatus includes a first controller having at least one interface and at least one processing device. The at least one interface is configured to communicate with a second controller and with a controlled network having multiple EtherNet/IP-compatible input/output (I/O) modules and multiple EtherNet/IP-compatible controlled devices. The at least one processing device is configured to detect a fault associated with the second controller while the second controller is in communication with at least one of the I/O modules and at least one of the controlled devices. The at least one processing device is also configured, upon detection of the fault associated with the second controller, to resume the communication with the at least one I/O module and the at least one controlled device without the at least one I/O module updating the at least one controlled device to a failsafe condition.

In a second embodiment, a method includes detecting, at a first controller configured to communicate with a second controller, a fault associated with the second controller while the second controller is in communication with at least one of multiple EtherNet/IP-compatible input/output (I/O) modules and at least one of multiple EtherNet/IP-compatible controlled devices in a controlled network. The method also includes, upon detection of the fault associated with the second controller, resuming the communication with the at least one I/O module and the at least one controlled device at the first controller without the at least one I/O module updating the at least one controlled device to a failsafe condition.

In a third embodiment, a non-transitory computer readable medium is encoded with computer-executable instructions that when executed cause at least one processing device to detect, at a first controller configured to communicate with a second controller, a fault associated with the second controller while the second controller is in communication with at least one of multiple EtherNet/IP-compatible input/output (I/O) modules and at least one of multiple EtherNet/IP-compatible controlled devices in a controlled network. The non-transitory computer readable medium is also encoded with computer-executable instructions that when executed cause at least one processing device to, upon detection of the fault associated with the second controller, resume the communication with the at least one I/O module and the at least one controlled device at the first controller without the at least one I/O module updating the at least one controlled device to a failsafe condition.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Some process control systems, such as EXPERION by HONEYWELL, are configured to support the EtherNet/IP communication protocol. In general, most EtherNet/IP systems do not provide any kind of network or controller redundancy that is particularly suited for the EtherNet/IP protocol. If a fault occurs in these systems at either the controller level or the controller network level, an I/O shed can occur at one or more controlled devices of the system. More particularly, when a fault occurs in an EtherNet/IP system without suitable redundancy provisions, the connection to one or more controlled devices can be lost, and the lost connection may cause the controlled devices to shed their I/O. For example, if an output device in an EtherNet/IP system loses connection to the controller that controls the output device, the output device may enter a failsafe operating state that is different than its previous operating state. In an industrial plant environment, this can cause an interruption in one or more processes while the plant is running. In such situations, maintenance workers or engineers have to identify the cause of the problem (the fault that caused the lost connection) and then bring the system back to a running state. This can lead to significant financial and temporal losses at the plant.

To resolve these issues, embodiments of this disclosure provide an EtherNet/IP network that includes controller redundancy or controller network redundancy features. Such features may be used in conjunction with a wide variety of controllers, such as the EXPERION C300 controller by HONEYWELL. The embodiments of this disclosure are described with respect to an industrial plant's process control system. However, this disclosure is not limited to industrial plant environments. The principles disclosed here are applicable to other environments and industries, as well.

Figure 1:
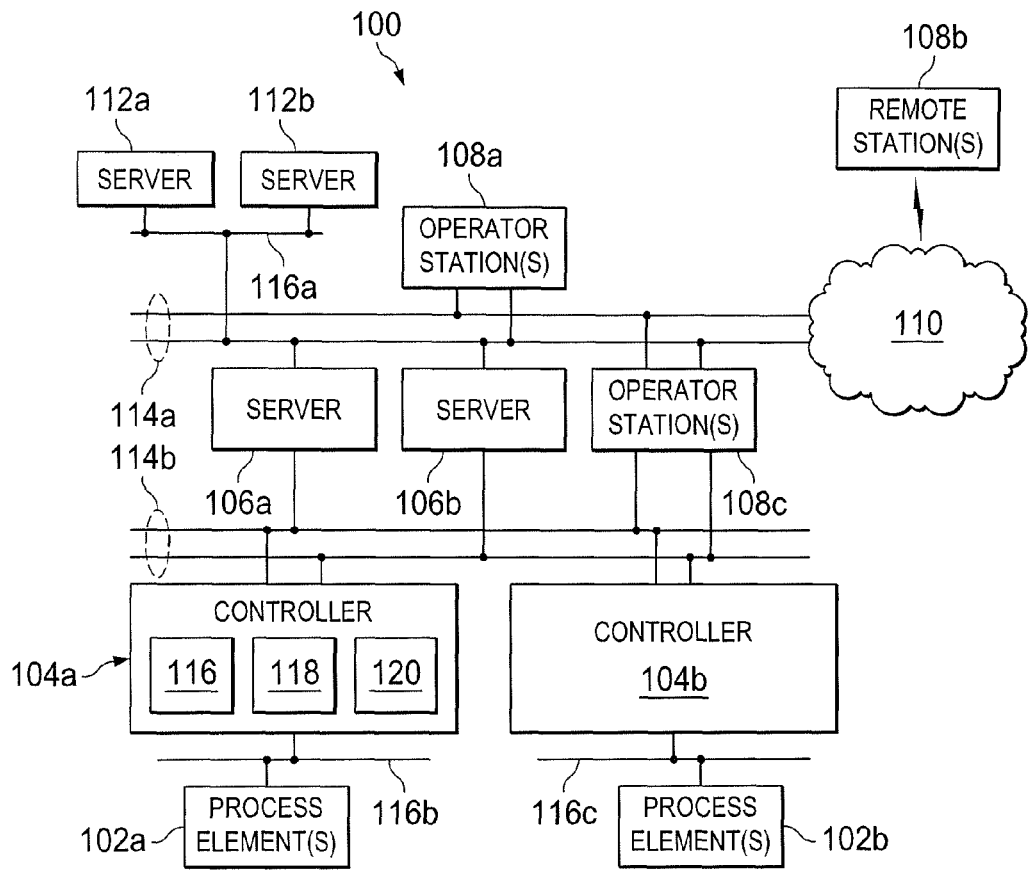
FIGS. 1 and 2 illustrate an example process control system in accordance with this disclosure.
Figure 2:
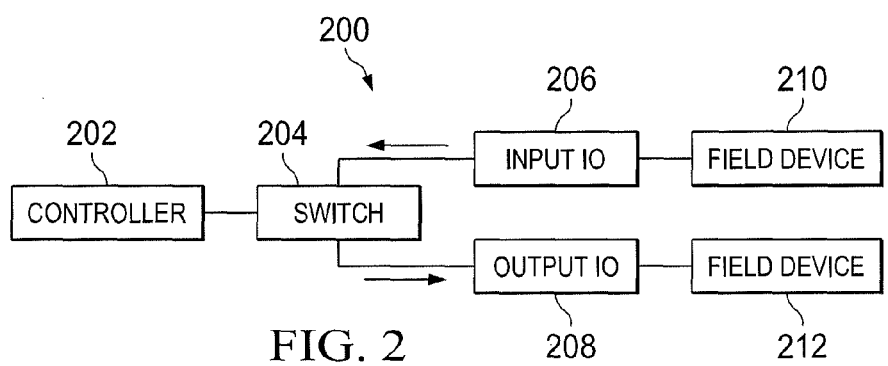

FIGS. 1 and 2 illustrate an example process control system 100 in accordance with this disclosure. As shown in FIG. 1, the system 100 includes one or more process elements 102a-102b. The process elements 102a-102b represent components in a process or production system that may perform any of a wide variety of functions. For example, the process elements 102a-102b could represent equipment used to manufacture chemical, pharmaceutical, paper, or petrochemical products. Each of the process elements 102a-102b includes any suitable structure for performing one or more functions in a process or production system, such as a sensor or actuator.

Two controllers 104a-104b are coupled to the process elements 102a-102b. The controllers 104a-104b control the operation of the process elements 102a-102b. For example, the controllers 104a-104b could receive measurements from sensors and generate control signals for actuators in order to control the production of chemical, pharmaceutical, paper, petrochemical, or other products. Each controller 104a-104b includes any suitable structure for controlling one or more of the process elements 102a-102b.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any suitable structure for providing access to or control of the controllers 104a-104b.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing direct user access to the controllers 104a-104b. As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any suitable structure for supporting user access and control of the system 100.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any suitable structure for controlling the overall operation of the system 100.

In some embodiments, each of the controllers 104a-104b includes one or more processing devices 116, such as one or more microprocessors, microcontrollers, digital signals processors, field programmable gate arrays, application specific integrated circuits, or discrete logic devices. Each of the controllers 104a-104b also includes one or more memories 118 storing instructions and data used, collected, or generated by the processing device(s) 116, such as a random access memory or a Flash or other read-only memory. In addition, each of the controllers 104a-104b includes one or more interfaces 120 facilitating communication over one or more networks or communication links. In particular embodiments, each of the controllers 104a-104b includes three interfaces 120, two for communicating over a redundant pair of networks and a third for communicating with the other controller.

As shown in FIG. 1, the system 100 includes various redundant networks 114a-114b and single networks 116a-116c that support communication between components in the system 100. Each of these networks 114a-114b, 116a-116c represents any network or combination of networks facilitating communication between components in the system 100. The networks 114a-114b, 116a-116c could, for example, represent Ethernet networks.

In one aspect of operation, the system 100 manages one or multiple processes for producing or processing one or more products (or parts thereof). As particular examples, the controllers 104a-104b and the servers 106a-106b could manage one or multiple processes used to produce chemical, pharmaceutical, paper, or petrochemical products using the process elements 102a-102b. The system 100 may implement a procedural automation mechanism that helps to automate the production processes. For example, the procedural automation mechanism may determine when certain tasks in a production process can be performed and which process elements 102a-102b are used during those tasks.

In accordance with this disclosure, various components of the system 100 support an EtherNet/IP communication protocol. For example, the controllers 104a-104b may represent EtherNet/IP controllers, the process elements 102a-102b may represent EtherNet/IP devices, and the networks 114a-114b and 116a-116c may represent EtherNet/IP networks. The controllers 104a-104b and one or more of the networks 114a-114b, 116a-116c may be configured with controller redundancy or controller network redundancy to provide failover support without causing an input/output shed. Additional details regarding this functionality are provided below.

FIG. 2 illustrates an example portion of an EtherNet/IP process control system 200, which may be used in conjunction with the system 100 of FIG. 1. In an EtherNet/IP network-based system, a controller communicates instructions and data to one or more I/O modules and controlled devices (also referred to as "field devices") for controlling one or more processes. Any failure in the communication between the controller and the controlled devices can cause a loss of control over the processes in which the controlled devices operate. As shown in FIG. 2, a controller 202 is connected through a switch 204 to an input I/O module 206 and an output I/O module 208. The input I/O module 206 is connected to an input field device 210, such as a sensor. The output I/O module 208 is connected to an output field device 212, such as a motor. The controller 202 is configured to control the devices 206-212.

In normal operation, the controller 202 receives input data associated with operation of the input device 210 (the sensor), such as by periodically scanning data from the input I/O module 206. The controller 202 performs processing on the input data and, based on the processed input data, controls the output device 212 (the motor) by transmitting data or signals to the output I/O module 208. The output I/O module 208 can, in turn, drive appropriate voltage, current, or other signals to the output device 212.

The output I/O module 208 may expect to regularly receive control signals from the controller 202. If the output I/O module 208 fails to receive a signal from the controller 202 at an expected time, a timeout clock may be started to measure the amount of time that elapses with no signal from the controller. If a predetermined period of time elapses without recovery of the signal from the controller 202, the output I/O module 208 can determine that a fault condition has occurred.

In the event of a fault condition, the output I/O module 208 may close the connection with the controller 202, and an output shed may occur. In an output shed, the output I/O module 208 updates the output device 212 to a failsafe condition. In the failsafe condition, one or more parameters of the output device 212 are updated from a current value to a failsafe value. For example, if the output device 212 is a motor, the motor speed may be reduced from a current operating speed to a slower failsafe speed or even stopped. The parameters associated with the failsafe condition may be pre-configured with the output I/O module 208 or may be user-configurable.

While the failsafe mode may help to protect the output device 212 or associated system from damage, the overall process in which the output device 212 operates is still interrupted. In an industrial plant environment, maintenance workers or engineers have to identify the cause of the interruption and then bring the system back to a running state. In a large industrial setting, this can lead to significant financial and time losses.

To solve this problem, embodiments of this disclosure provide an EtherNet/IP-based process control system that includes controller redundancy and controller network redundancy. These mechanisms can be used in order to reduce or avoid a system failure and a corresponding I/O shed.

Although FIGS. 1 and 2 illustrate one example of a process control system 100, various changes may be made to FIGS. 1 and 2. For example, a process control system could include any number of process elements, controllers, servers, operator stations, and networks. Also, the makeup and arrangement of the system 100 is for illustration only. Components could be added, omitted, combined, or placed in any other configuration according to particular needs. Further, while described as being used to produce or process certain types of products, the system 100 could be used in any other manner.

Figure 3:
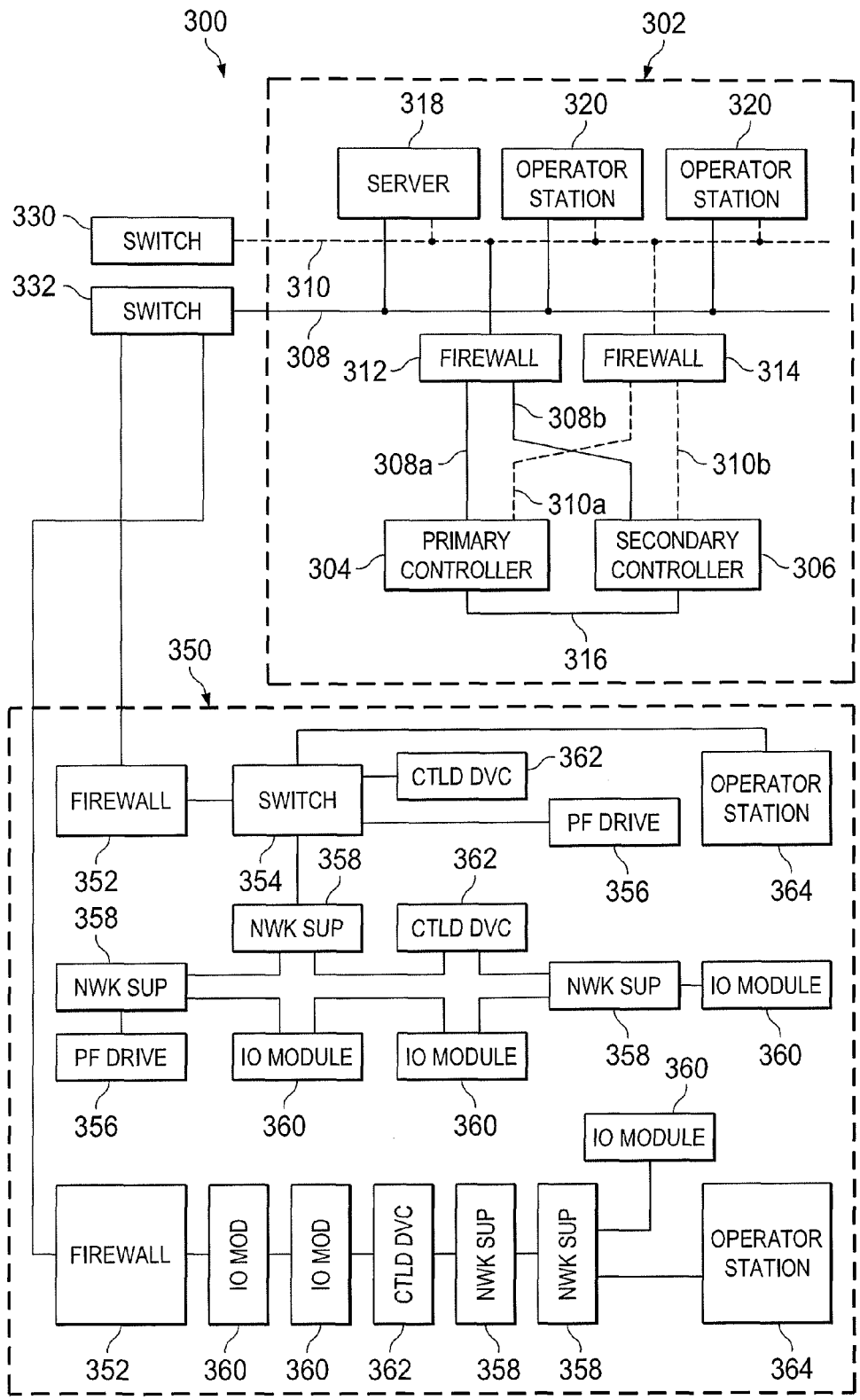
FIG. 3 illustrates additional details of an example EtherNet/IP process control system configured for controller redundancy and controller network redundancy in accordance with this disclosure.

FIG. 3 illustrates additional details of an example EtherNet/IP process control system 300 configured for controller redundancy and controller network redundancy in accordance with this disclosure. The system 300 may represent or be used in conjunction with the system 100 of FIG. 1 or the system 200 of FIG. 2.

As shown in FIG. 3, the system 300 includes a controller system 302 that includes a primary controller 304 and a secondary controller 306. Each controller 304-306 represents any suitable EtherNet/IP-compatible controller for controlling one or more devices in an EtherNet/IP network. In some embodiments, each controller 304-306 may be an EXPERION C300 controller. Each controller 304-306 is connected to a primary controller network 308 and a secondary controller network 310. Firewalls 312-314 placed between the controllers 304-306 and other portions of the process control system 300 provide a level of security over the incoming and outgoing traffic of the controllers 304-306.

The primary controller 304 is directly coupled to the secondary controller 306 via a wired connection or cable 316. The cable 316 allows direct communication between the controllers 304-306. In accordance with this disclosure, the controllers 304-306 are able to share, through the cable 316, status information regarding the operating condition or "health" of each controller 304-306 and each controller network 308-310 (or any other status information that may be used to determine when a fault condition has occurred or is about to occur). This is described in greater detail below.

The controller system 302 also includes at least one server 318 coupled to the controllers 304-306. The server 318 may represent one or more of the servers 106a-106b, 112a-112b of FIG. 1. In some embodiments, the server 318 may be an EXPERION PKS server. The process control system 300 also includes two operator stations 320. The operator stations 320 may represent one or more of the operator stations 108a-108c of FIG. 1. In some embodiments, the operator stations 320 may be EXPERION PKS workstations. The server 318 and operator stations 320 are configured to initially provide or update programming logic to the controllers 304-306 and monitor and maintain the controllers 304-306, controller system 302, and process control system 300. Although one server 318 and two operator stations 320 are shown in FIG. 3, other numbers of servers 318 and operator stations 320 are possible.

The controller system 302 is coupled to a controlled network 350 via a pair of switches 330-332. The switches 330-332 route information and signals between the controller system 302 and the controlled network 350. Each switch 330-332 may represent any suitable switch for use in an EtherNet/IP network.

The controlled network 350 includes a number of controlled devices that are controlled by one or more of the controllers 304-306. The controlled network 350 also includes other equipment or devices that may not be directly controlled by the controllers 304-306 but are part of the operations of the controlled network 350. In this example, the controlled network 350 includes one or more firewalls 352, one or more switches 354, one or more PF drives 356, one or more network supervisors 358, one or more input or output I/O modules 360, one or more controlled devices 362, and one or more operator stations 364. Certain devices among the controlled network 350 may be organized into one or more sub-networks. Example sub-networks may be configured as rings, as stars, linearly, or in any other suitable network configuration. For example, as shown in FIG. 3, some of the network supervisors 358, I/O modules 360, and controlled devices 362 may be configured as a ring network.

In accordance with this disclosure, the system 300 is configured for both controller redundancy and controller network redundancy in order to avoid a system failure and a corresponding I/O shed. Controller redundancy is provided in the system 300 by the primary controller 304 and the secondary controller 306. In one aspect of operation, the primary controller 304 is usually the active controller of the system 300, and the secondary controller 306 is usually passive. The primary controller 304 sends and receives signals to and from the controlled network 350 through the switches 330-332. Thus, in normal operating conditions, the primary controller 304 provides control over the controlled network 350 and the associated controlled devices 362.

While the primary controller 304 provides control over the controlled network 350, the primary controller 304 is in communication with the secondary controller 306 via exchanges of signals through the cable 316. As the primary controller 304 executes controller operations, controller operation information and other status information regarding the operating condition or "health" of the primary controller 304 can be synchronized across the cable 316 to the secondary controller 306. Such information may include which I/O modules 360 or controlled devices 362 the primary controller 304 most recently communicated with and what operating values or data was exchanged with these I/O modules 360 or controlled devices 362.

If the operation of the primary controller 304 fails in some manner, such as due to a power failure or hardware failure, a fault condition occurs at the primary controller 304. In the event of a fault condition at the primary controller 304, the secondary controller 306 take over the control functions of the primary controller 304. At that point, the secondary controller 306 (operating in the primary mode) continues to control one or more components in the EtherNet/IP controlled network 350 without resulting in a connection loss to any I/O modules 360 or controlled devices 362 and without resulting in an I/O shed.

In order to avoid a connection loss and I/O shed, the secondary controller 306 detects the fault condition at the primary controller 304 and resumes control operations for the controlled network 350 quickly. In this way, the I/O modules 360 and controlled devices 362 do not detect an interruption or fault at the primary controller 304, which would result in an I/O shed. In other words, the secondary controller 306 is configured to detect the fault condition at the primary controller 304 and take over control in a seamless manner so that the devices of the controlled network 350 still believe that they are in communication with the primary controller 304.

Controller network redundancy is provided in the system 300 by the primary controller network 308 and the secondary controller network 310. The primary controller 304 and the secondary controller 306 are each coupled to at least two network cables, where each cable is associated with one of the controller networks 308-310. Specifically, the primary controller 304 is coupled to a cable 308a associated with the primary controller network 308 and to a cable 310a associated with the secondary controller network 310. Similarly, the secondary controller 306 is coupled to a cable 308b associated with the primary controller network 308 and to a cable 310b associated with the secondary controller network 310. In some embodiments the cables 308a-308b and 310a-310b are Ethernet cables, and each controller 304-306 includes a plurality of Ethernet connection points or jacks to which the associated cables are connected.

In one aspect of operation, the primary controller network 308 is usually the active controller network through which communications between the primary controller 304 or secondary controller 306 and the controlled network 350 occurs. Communications to the controlled network 350 pass through the primary controller network 308, through one or both switches 330-332, and to a destination device in the controlled network 350. The reverse path is followed for communications from the controlled network 350. In contrast, the secondary controller network 310 is usually passive. That is, during normal operations, the secondary controller network 310 does not carry the main signal transmissions associated with control of the controlled network 350, although the secondary controller network 310 may carry ancillary signal transmissions (such as those related to detection of fault conditions) during normal operations.

While the primary controller 304 or secondary controller 306 provides control over the controlled network 350 via the primary controller network 308, the primary controller 304 or secondary controller 306 may continually detect and determine status information regarding the operating condition or "health" of the primary controller network 308. If the operation of the primary controller network 308 fails in some manner (such as due to a cable break), a fault condition occurs on the primary controller network 308. If the primary controller 304 or secondary controller 306 detects a fault condition on the primary controller network 308, the primary controller 304 or secondary controller 306 opens communication with the secondary controller network 310. At that point, I/O communication is resumed on the secondary controller network 310 without resulting in a connection loss to any I/O modules 360 or controlled devices 362 and without resulting in an I/O shed. In order to avoid a connection loss and I/O shed, the primary controller 304 or secondary controller 306 detects the fault condition in the primary controller network 308 and switches communications to the secondary controller network 310 quickly. As a result, the I/O modules 360 and controlled devices 362 do not detect any interruption or fault, which would result in an I/O shed.

In some embodiments, programming instructions are implemented in the application layer of the controllers 304-306 in order to provide the redundancy capability. The instructions can be specifically developed to be compatible with the EtherNet/IP protocol. For example, the secondary controller 306 may be programmed with instructions to detect all devices in the EtherNet/IP controlled network 350 that the primary controller 304 was in communication with at the time of a fault. The secondary controller 306 may also be programmed with instructions to resume communications with those devices in the event of a fault condition at the primary controller 304. Likewise, each controller 304-306 may be programmed with instructions to detect a fault in the primary controller network 308 and resume communications via the secondary controller network 310. Such instructions may be initially installed into the controllers 304-306 and later maintained by an engineer or system personnel using the server 318 or operator stations 320. Once the instructions are installed, the controllers 304-306 may operate and provide the redundancy capabilities independently without continual management or oversight by the operator stations 320 or server 318.

Although FIG. 3 illustrates one example of an EtherNet/IP process control system 300 that provides controller redundancy and controller network redundancy, various changes may be made to FIG. 3. For example, a process control system could include any number of process elements, controllers, servers, operator stations, and networks. Also, the makeup and arrangement of the process control system 300 is for illustration only. Components could be added, omitted, combined, or placed in any other configuration according to particular needs. For instance, while the operator stations 320 are shown as part of the controller system 302, the operator stations 320 may be considered outside of the controller system 302. Further, while described as being used to produce or process certain types of products, the process control system 300 could be used in any other manner.

Figure 4:
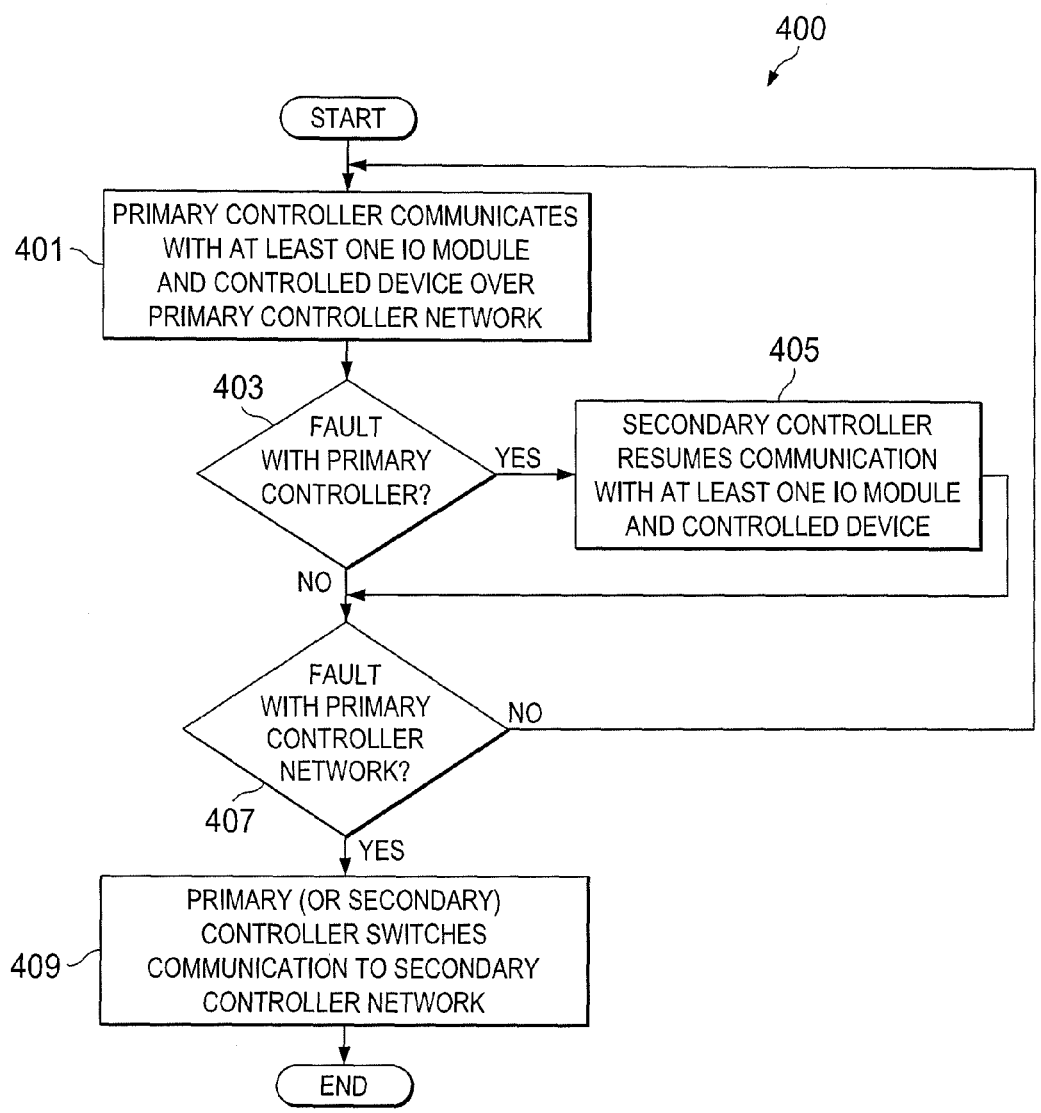
FIG. 4 illustrates an example method for operating an EtherNet/IP process control system in accordance with this disclosure.

FIG. 4 illustrates an example method 400 for operating an EtherNet/IP process control system in accordance with this disclosure. The method 400 may be performed in association with the system 100 of FIG. 1, the system 200 of FIG. 2, or the system 300 of FIG. 3. However, the method 400 could also be used with any other suitable system.

At step 401, a primary controller in the EtherNet/IP system communicates with at least one I/O module and at least one controlled device over a primary controller network. At step 403, a secondary controller detects whether or not a fault associated with the primary controller occurs while the primary controller is in communication with the at least one I/O module and the at least one controlled device.

If a fault is detected at step 403, the method continues to step 405. At step 405, upon detection of the fault, the secondary controller resumes communication with the at least one I/O module and the at least one controlled device. The secondary controller takes over the communication quickly enough so that the at least one I/O module does not update the at least one controlled device to a failsafe condition.

If no fault is detected at step 403, the method continues to step 407. At step 407, the primary controller (or the secondary controller if the secondary controller is operating in the primary mode) detects whether or not a fault associated with the primary controller network occurs. If a fault is detected at step 407, the method continues to step 409. At step 409, upon detection of the fault, the primary controller or secondary controller switches communication with the at least one I/O module and the at least one controlled device to the secondary controller network. The switch to the secondary controller network occurs quickly enough so that the at least one I/O module does not update the at least one controlled device to a failsafe condition. If no fault is detected at step 407, the method returns to step 401, and the method repeats.

Although FIG. 4 illustrates one example of a method 400 for operating an EtherNet/IP process control system, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
  a first controller configured to generate control signals for control of multiple Ethernet/Industrial Protocol (EtherNet/IP)-compatible controlled field devices, the first controller comprising:
    first and second interfaces configured to communicate with a controlled network comprising multiple EtherNet/IP-compatible input/output (I/O) modules and the multiple EtherNet/IP-compatible controlled field devices, the first interface configured to communicate over a first controller network and the second interface configured to communicate over a second controller network, each of the first and second interfaces configured to communicably connect to at least one switch that routes communications between the first controller and the controlled network;
a third interface configured to communicate with a second controller; and
at least one processing device configured to:
detect a fault associated with the second controller while the second controller is in communication with at least one of the I/O modules and at least one of the controlled field devices;
upon detection of the fault associated with the second controller, resume the communication with the at least one I/O module and the at least one controlled field device without the at least one I/O module updating the at least one controlled field device to a failsafe condition;
detect a fault associated with the first controller network while the first controller is in communication with the at least one I/O module and the at least one controlled field device over the first controller network; and
upon detection of the fault associated with the first controller network, switch the communication with the at least one I/O module and the at least one controlled field device to the second controller network without the at least one I/O module updating the at least one controlled field device to the failsafe condition.

2. The apparatus of claim 1, wherein the third interface is configured to connect to a wired Ethernet connection that directly couples the first controller to the second controller and that transports controller status information between the first controller and the second controller.

3. The apparatus of claim 1, wherein the at least one processing device is configured to resume the communication with the at least one I/O module and the at least one controlled field device without the at least one I/O module setting an operating parameter of the at least one controlled field device to a failsafe value.

4. The apparatus of claim 1, wherein the apparatus is configured for use in an EtherNet/IP process control system associated with an industrial plant.

5. The apparatus of claim 1, wherein:
the first interface is configured to connect to at least one first wired connection that forms a portion of the first controller network; and
the second interface is configured to connect to at least one second wired connection that forms a portion of the second controller network.

6. The apparatus of claim 5, wherein:
the first interface is configured to communicably connect to a first firewall connected to the at least one first wired connection; and
the second interface is configured to communicably connect to a second firewall connected to the at least one second wired connection.

7. The apparatus of claim 5, wherein the detected fault associated with the first controller network comprises a cable break in the at least one first wired connection.

8. A method comprising:
detecting, at a first controller configured to communicate with a second controller, a fault associated with the second controller while the second controller is in communication with at least one of multiple Ethernet/Industrial Protocol (EtherNet/IP)-compatible input/output (I/O) modules and at least one of multiple EtherNet/IP-compatible controlled field devices in a controlled network, the first controller configured to generate control signals for control of the multiple EtherNet/IP-compatible controlled field devices, the first controller also configured to communicate over a first controller network via a first interface and to communicate over a second controller network via a second interface, each of the first and second interfaces communicably connected to at least one switch that routes communications between the first controller and the controlled network;
upon detection of the fault associated with the second controller, resuming the communication with the at least one I/O module and the at least one controlled field device at the first controller without the at least one I/O module updating the at least one controlled field device to a failsafe condition;
detecting, at the first controller, a fault associated with the first controller network while the first controller is in communication with the at least one I/O module and the at least one controlled field device over the first controller network; and
upon detection of the fault associated with the first controller network, switching the communication with the at least one I/O module and the at least one controlled field device to the second controller network without the at least one I/O module updating the at least one controlled field device to the failsafe condition.

9. The method of claim 8, further comprising:
communicating directly with the second controller over a direct connection.

10. The method of claim 9, wherein communicating directly with the second controller comprises receiving controller status information from the second controller over a wired Ethernet connection that directly couples the first controller to the second controller.

11. The method of claim 9, wherein communicating directly with the second controller comprises receiving information identifying the at least one I/O module and the at least one controlled field device and what data was exchanged with the at least one I/O module and the at least one controlled field device.

12. The method of claim 8, wherein an operating parameter of the at least one controlled field device is set to a failsafe value in the failsafe condition.

13. The method of claim 8, wherein the first controller is configured for use in an EtherNet/IP process control system associated with an industrial plant.

14. The method of claim 8, wherein:
the first interface is connected to at least one first wired connection that forms a portion of the first controller network; and
the second interface is connected to at least one second wired connection that forms a portion of the second controller network.

15. The method of claim 14, wherein:
the first interface is communicably connected to a first firewall connected to the at least one first wired connection; and
the second interface is communicably connected to a second firewall connected to the at least one second wired connection.

16. The method of claim 14, wherein detecting the fault associated with the first controller network comprises detecting a cable break in the at least one first wired connection.

17. A non-transitory computer readable medium encoded with computer-executable instructions that when executed cause at least one processing device to:

detect, at a first controller configured to communicate with a second controller, a fault associated with the second controller while the second controller is in communication with at least one of multiple Ethernet/Industrial Protocol (EtherNet/IP)-compatible input/output (I/O) modules and at least one of multiple EtherNet/IP-compatible controlled field devices in a controlled network, the first controller configured to generate control signals for control of the multiple EtherNet/IP-compatible controlled field devices, the first controller also configured to communicate over a first controller network via a first interface and to communicate over a second controller network via a second interface, each of the first and second interfaces communicably connected to at least one switch that routes communications between the first controller and the controlled network;

upon detection of the fault associated with the second controller, resume the communication with the at least one I/O module and the at least one controlled field device at the first controller without the at least one I/O module updating the at least one controlled field device to a failsafe condition;

detect, at the first controller, a fault associated with the first controller network while the first controller is in communication with the at least one I/O module and the at least one controlled field device over the first controller network; and upon detection of the fault associated with the first controller network, switch the communication with the at least one I/O module and the at least one controlled field device to the second controller network without the at least one I/O module updating the at least one controlled field device to the failsafe condition.

18. The non-transitory computer readable medium of claim 17, wherein the non-transitory computer readable medium is encoded with computer-executable instructions that when executed cause the at least one processing device to:

communicate directly with the second controller.

19. The non-transitory computer readable medium of claim 18, wherein the computer-executable instructions that when executed cause the at least one processing device to communicate directly with the second controller comprise:

computer-executable instructions that when executed cause the at least one processing device to transmit controller status information to the second controller over a wired Ethernet connection that directly couples the first controller to the second controller.

20. The non-transitory computer readable medium of claim 18, wherein the computer-executable instructions that when executed cause the at least one processing device to communicate directly with the second controller comprise:

computer-executable instructions that when executed cause the at least one processing device to receive information identifying the at least one I/O module and the at least one controlled field device and what data was exchanged with the at least one I/O module and the at least one controlled field device.

* * * * *